(12) United States Patent
Skinner

(10) Patent No.: US 8,454,228 B2
(45) Date of Patent: Jun. 4, 2013

(54) THERMAL DETECTOR TESTING DEVICE

(76) Inventor: Matthew Skinner, Saratoga Springs, UT (US)

( * ) Notice: Subject to any disclaimer, the term of this patent is extended or adjusted under 35 U.S.C. 154(b) by 452 days.

(21) Appl. No.: 12/399,327

(22) Filed: Mar. 6, 2009

(65) Prior Publication Data
US 2010/0226408 A1 Sep. 9, 2010

(51) Int. Cl.
*G01N 25/00* (2006.01)
*G01K 15/00* (2006.01)
*G01K 1/00* (2006.01)

(52) U.S. Cl.
USPC .................. 374/5; 374/1; 374/208; 374/141

(58) Field of Classification Search
USPC .................. 374/1, 3, 5; 73/1.02; 340/515
See application file for complete search history.

(56) References Cited

U.S. PATENT DOCUMENTS

| | | | | |
|---|---|---|---|---|
| 2,758,469 A * | 8/1956 | Clements et al. | ................. | 374/1 |
| 3,067,604 A * | 12/1962 | Brunson | ........................... | 374/1 |
| 3,216,236 A | 11/1965 | Rohrbach | ......................... | 374/3 |
| 3,699,800 A * | 10/1972 | Waldron | ........................... | 374/1 |
| 3,802,249 A | 4/1974 | Clawson | | |
| 4,643,586 A | 2/1987 | Hansen | | |
| 4,819,249 A | 4/1989 | Ekstrom et al. | | |
| 4,901,257 A * | 2/1990 | Chang et al. | ..................... | 702/99 |
| 5,170,148 A | 12/1992 | Duggan et al. | | |
| 5,611,620 A | 3/1997 | Wantz | | |
| 5,670,946 A | 9/1997 | Ellwood et al. | | |
| 5,936,533 A | 8/1999 | Bernal et al. | | |
| 6,015,230 A | 1/2000 | Wantz et al. | | |
| 6,100,510 A * | 8/2000 | Chen et al. | ..................... | 219/497 |
| 6,423,962 B1 | 7/2002 | Pepper | | |
| 6,640,608 B2 | 11/2003 | Pepper et al. | | |
| 7,785,000 B2 * | 8/2010 | James et al. | ...................... | 374/1 |
| 2005/0116168 A1 | 6/2005 | Kaushal | | |
| 2006/0051254 A1 | 3/2006 | Seol | | |
| 2008/0192797 A1* | 8/2008 | Ko et al. | .......................... | 374/2 |
| 2009/0121033 A1* | 5/2009 | Sjogren et al. | ................ | 237/2 A |

OTHER PUBLICATIONS www.firedetectiondevices.com, FDD Fire Detection Devices Ltd, FD 200 Cordless Heat Detector Tester Product Description & Operating Instructions, 5 pages.
sss.sdifire.com, Solo detectortesters, A complete range of test and maintenance equipment for smoke, heat and CO detectors, 4 pages.

* cited by examiner

*Primary Examiner* — Mirellys Jagan
(74) *Attorney, Agent, or Firm* — Thorpe North & Western LLP

(57) ABSTRACT

A testing device for testing thermal detectors includes a hollow sleeve, open on at least one end, configured to receive a thermal detector. The hollow sleeve can have a length greater than a diameter. A heater is positioned is in proximity to the hollow sleeve, and is configured to provide heat for testing the thermal detector. The heater can be a flexible foil heater. A power source is provided to supply power to the heater. A power control module can be provided for variably adjusting a set point temperature or a rate of temperature rise for the heater.

17 Claims, 4 Drawing Sheets

THERMAL DETECTOR TESTING DEVICE

BACKGROUND

Fire, smoke, and heat detector/alarm systems in residential and commercial buildings are able to save lives and are required to be installed by building codes. Many different types of such systems are in use and are designed to meet the needs of various kinds of installations. Residential installations typically rely upon smoke detectors, which respond to the presence of airborne smoke particles. However, smoke detectors can be unreliable and falsely activated in commercial and industrial environments due to the presence of other airborne materials, such as vapors and dusts produced in the normal course of commercial and industrial activity. As a result, many commercial and industrial installations use heat detectors which are activated by certain changes in temperature indicative of a possible fire.

Many heat detectors are either a rate compensated type or operate on the rate of rise principle. These types of detectors are capable of sensing an elevated temperature and/or a rate of rise of air temperature surrounding the detector. The temperature of air near a ceiling tends to rise rapidly in the event of a fire, and heat detectors incorporating the rate of rise or rate compensation feature are designed to respond to rapid rises in temperature in order to discriminate between more gradual temperature increases unrelated to fire incidents. Rate compensated heat detectors can be a combination of a fixed temperature and a rate anticipation detector, meaning such detectors can also activate an alarm simply upon reaching a given temperature during slow heat rise. During rapid heat rise, however, they may be designed to recognize a temperature lag between the detector temperature and air temperature. The temperature of the heat detector unit will lag behind rapidly rising temperature of surrounding air because of the time required for heat to transfer from the ambient air to the heat sensor unit. The extent of the lag depends on how quickly the air temperature rises. Lag may be greater for a more rapid air temperature rise. Rate compensated heat detectors are constructed to compensate for this temperature lag, so as to trigger an alarm at a lower detector temperature if the temperature of the detector is rising rapidly, and trigger the alarm at a higher detector temperature if the rate of rise is slower.

Various types of heat detectors are available with various temperature ratings to respond to different temperature ranges. Each heat detector also has a radius of effective coverage. This radius may vary from one heat detector model to another. A typical installation requires a certain number of heat detectors per square foot be installed on a ceiling of the structure to be protected. The spacing between the detectors is determined by the effective coverage capability of each unit. A large commercial or industrial space, such as a warehouse, may have a considerable number of heat detectors. Furthermore, such spaces commonly have high ceilings, which places the heat detectors out of easy reach.

Often, operational testing of heat detectors, if such testing is done at all, is accomplished with makeshift methods or heat sources. Commonly employed heat sources may include heat guns and heat lamps. A ladder may be placed under each heat detector and the heat source can then be carried by hand up the ladder to test the detector. Long extension cords may be required for this approach. This can be time consuming, inefficient, and ineffective for testing heat detectors. Other detector testing means include using a soldering iron or heated water and can present significant safety concerns. A need therefore exists for a safe, efficient and reliable method for testing heat detector installations.

SUMMARY OF THE INVENTION

The invention provides a testing device for testing thermal detectors. The testing device includes a hollow sleeve, open on at least one end for receiving a thermal detector. The hollow sleeve may be heat conductive. The hollow sleeve may have a length greater than a diameter. A heater is in proximity to at least a portion of the hollow sleeve. The heater may be a flexible foil heater. The testing device further includes a power source for providing power to the heater. The testing device may provide variable power to allow for an adjustable or variable set point temperature or rate of temperature rise for the heater. A thermal detector may be tested by providing power to the heater and positioning the testing device over a thermal detector, so that the thermal detector is within the hollow of the hollow sleeve.

DETAILED DESCRIPTION OF EXAMPLE EMBODIMENT(S)

Reference will now be made to the exemplary embodiments illustrated, and specific language will be used herein to describe the same. It will nevertheless be understood that no limitation of the scope of the invention is thereby intended. Additional features and advantages of the invention will be apparent from the detailed description which follows, taken in conjunction with the accompanying drawings, which together illustrate, by way of example, features of the invention.

Various types of thermal or heat detectors exist in the market. Some of the main categories include fixed temperature, rate-compensated, and rate of rise heat detectors. Fixed temperature detectors may need to be completely heated to the alarm temperature and there may be a time lag before activation with a quickly expanding fire. Rate-of-rise devices are triggered by the rate of increase in ambient temperature. These may be subject to false alarms caused by harmless, transient thermal gradients such as the rush of warm air from process ovens. Some devices have even combined multiple methods of fire/heat detection in an attempt to provide more comprehensive early fire detection. These are known as rate-compensated detectors. Rate compensated detectors are able to sense surrounding air temperature regardless of fire growth rate because rate compensated detectors can operate in terms of both rate of temperature rise and fixed temperature levels. At a predetermined danger point, the system can be activated.

Figure 1:
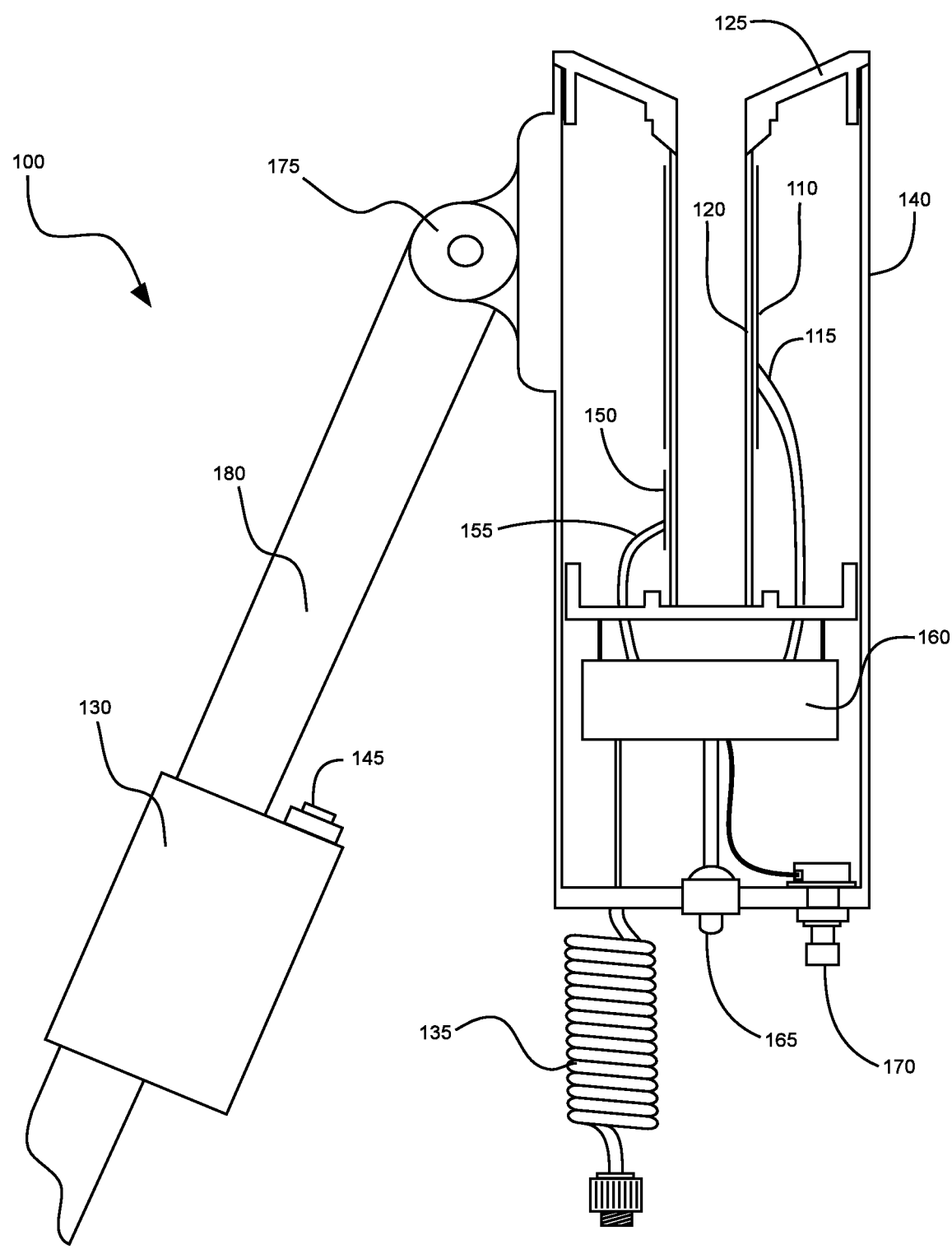
FIG. 1 is a cross-sectional view of a thermal detector testing device in accordance with an embodiment.

As illustrated in FIG. 1, an embodiment of a system, indicated generally at 100, is provided for testing heat or thermal detector devices. The system can include a hollow sleeve 120 which is open on at least one end for receiving a heat detector therein. The hollow sleeve may be cylindrical, having a length greater than a diameter, and define a hollow inside of the sleeve. As used herein, reference to the inside or outside of the hollow sleeve is to be understood as reference to being within or without the hollow of the sleeve. Also, it is noted that the hollow sleeve may be in the form of many other useful shapes other than a simple cylinder and be functionally operable for thermal detector testing. For example, the hollow sleeve may be beveled in or out, may be have concave curvature on the inner walls of the sleeve away from the device being tested or have other variations in geometry.

Proximal to the hollow sleeve can be a heater 110. The heater can be positioned either outside the hollow sleeve 120, as shown in FIG. 1, or inside the hollow sleeve. Where the heater is positioned outside the hollow sleeve, the hollow sleeve may be formed of a heat conductive material to allow a transfer of heat from the heater through the sleeve so as to heat a heat detector within the sleeve. One such example of heat conductive material includes metal, although various other materials may be used as would be recognized and understood by one having skill in the art. Alternately, in embodiments where the heater is outside of the hollow sleeve, the hollow sleeve may have vents formed therein to allow heat to pass through the vents and into the hollow of the hollow sleeve. A device 100 may also be formed incorporating a heat conductive sleeve having vents therethrough.

Many different types of heaters may be suitable for use in the device 100. A variety of heating elements are well-known and would be recognized by one having skill in the art as suitably capable of providing heat in the device. Some types of heaters may include band, cartridge, ceramic, coil, cable, or infrared heaters. Other types of heaters may also be used. In accordance with one embodiment, the device may have a heater 110 which is a flexible foil heater. Flexible foil heaters can be rugged, flexible, elastomeric, provide reliability in many applications and under a wide range of temperatures. Flexible foil heaters can be custom formed, have lower power consumption as compared with some other heat sources, provide heat uniformly across the heater, and be more economical than other types of heaters.

The heater 110 can be positioned in proximity to the hollow sleeve 120. Positioning the heater at one end of the hollow sleeve or on one side of the sleeve may suitably provide heat for some applications. However, in other applications, it may be desirable to more uniformly provide heat to the heat detector, or the inside of the hollow sleeve. For such applications, a heater may be positioned so as to circumscribe, or partially circumscribe, the hollow sleeve, either inside or out. The heater may also be positioned closer to a top or bottom of the hollow sleeve to better suit particular applications. The device 100 of FIG. 1 depicts a cross-sectional view of a heater at least partially circumscribing the hollow sleeve. The heater may extend partially or fully along a length of the hollow sleeve. Configuration of the heater may depend upon the requirements for a desired application. In one aspect, the device may comprise a plurality of heaters. A plurality of heaters may be useful for providing different temperatures at different places on the hollow sleeve. A plurality of heaters may also be useful for providing better coverage of the hollow sleeve or a heat detector and thus provide a more uniform heat.

The device 100 includes a power source. As used herein, "power source" may refer to an actual source of power, such as a battery or AC outlet, or a mechanism through which the device or heater receives power. For example, although an AC power outlet may be an actual source of power, a plug extending from the device configured to plug into the AC power outlet may also be considered the "power source."

The power source can provide either AC or DC power. The power source is configured to provide power to the heater 110 to heat the heater. The power source can be electrically connected to the heater. The power source may be formed or positioned anywhere useful for providing power to the heater. For example, the power source may be remote from the device, it may be removably attached to the device, or it may be integrally formed with the device. In many applications, it may be desirable to have a portable testing device which does not require the device to be plugged in to an AC power outlet. Accordingly, the device may include a battery 130 as a power source. The battery (or other power source) may be indirectly connected to the heater. As shown in FIG. 1, lead wires 115 extend from the heater and are electrically coupled to a power cord 135 which is removably attachable at 145 to the battery.

The device 100 can include a switch 170 to open and close the circuit connecting the battery and the heater 110. A user can use the switch to close the circuit to start current flow to heat the heater for testing a heat detector. The device may include a control module 160 for controlling various operations of the device. For example, the control module may control the current flow to the heater for the heater to maintain a particular temperature. Such an operation may be performed by the heater itself, the switch, or other devices as would be understood by one having skill in the art. The control module may perform other operations as well. For example, a temperature sensor or monitor 150 may be included in the device for monitoring the temperature of the heater or of the hollow sleeve 120. The temperature monitor may be electrically coupled to the control module via lead wires 155. The control module may receive input from the temperature monitor and recognize a need to either raise, lower, or maintain power levels for the heater depending on the input from the temperature monitor.

In one embodiment, the control module 160 and the switch 170 may be capable of a variety of other operations. As described above, various heat detectors may be activated in various ways. The device 100 may be configured to provide a fixed temperature or heat level to test fixed temperature detectors. Alternatively, the device may be configured to provide a rate of temperature rise for testing rate of temperature rise detectors. In another embodiment, the device may be configured to provide both a fixed temperature level and a rate of temperature rise. The switch may receive a user input to allow a user to select which operation to perform. The control module can then control the heater temperature to either provide a fixed temperature level or an increasing temperature. The control module may be configured to raise the temperature of the heater according to rate of temperature rise detector manufacturer specifications for activating such a heat detector. Whereas different detector manufacturers may provide different specifications for activation of the detector, the switch may comprise controls for adjusting the rate of temperature rise. Likewise, different fixed temperature detector manufacturers may provide different specifications for activation of the detector, and the switch may comprise controls for adjusting the fixed temperature level of the device. The device may be configured to allow a user to easily switch between modes of operation to test multiple detectors of differing types or to test multiple testing operations of a single detector, such as a rate-compensated detector.

The control module 160 may be further configured to provide feedback to the user regarding various information about the device 100. Such feedback or information may include: whether the power is on or off; whether the device is functionally operational; whether the device is ready to begin testing; whether testing is in progress; whether testing has been completed; whether the heater is heating or is hot; whether the heater has cooled; and other useful information which would be apparent to one having skill in the art. In one aspect, such feedback may be provided to a user via one or more light emitting diodes or LEDs 165. The LED may provide information to a user by turning on or off, blinking at various intervals or in various patterns, or changing color. The control module may comprise an output module configured to monitor testing progress and provide the output through output mechanisms, such as the LED described above.

The device 100 may include a heat shield or a housing 140. The housing may be configured to house or enclose various portions of the device. The housing may surround the heater 110 and/or the hollow sleeve 120. The housing may be thermally insulated from the heater and the hollow sleeve to provide a cooler surface when the device is in operation. The housing may be configured so as to be safe to human touch during operation of the heater. The housing may be formed of any variety of suitable materials such as, but not limited to, plastics, metals, composites, or combinations of plastics, metals, and/or composites. The housing may comprise one or more apertures to allow various portions of the device, such as cables, indicators, etc., to pass through the housing. Alternatively, an LED can provide feedback through a partially transparent housing, and a switch can be operated within the housing by pressing or flexing the housing, it may be desirable to have such control elements of the device accessible through or outside of the housing as is shown in FIG. 1.

The device 100 may further include a funnel 125 coupled to the hollow sleeve 120 and/or the housing 140. As the funnel may come in contact with a non-detecting portion of a detector or a detector attachment surface, such as a ceiling, it may be desirable to at least partially thermally isolate the funnel from the hollow sleeve. The funnel may be operable to guide a heat detector into the hollow of the hollow sleeve for testing. The funnel may be formed of any suitable material. In one aspect, the funnel may be formed of a metal material and be coupled to the hollow sleeve with minimal metal contacts to reduce heat transfer to the funnel. In another aspect, the funnel may be formed of heat resistive rubber, plastic, or composite materials. Use of a rubber or other deformable material on at least an upper surface of the funnel may reduce a risk of damage or injury to detectors, detector attachment surfaces, etc.

As indicated above, testing of heat detectors may be difficult due to positioning of the detector on a ceiling. Some ceilings may be high and the detectors out of reach. In one embodiment, the device 100 includes a boom 180. The hollow sleeve 120 may be disposed at one end of the boom. A user can hold the boom near the other end of the boom and position the hollow sleeve over a heat detector for testing at a distance. The boom may be adjustably extendable for testing detectors at varying distances. An angle of the boom with respect to the hollow sleeve may also be adjustable to accommodate detector testing from various positions. In one aspect, the angle of the boom may be adjustable at a hinge 175 by which the boom is connected to the housing 140. The boom may be further configured with controls at the end opposite the hollow sleeve, so as to allow a user to control the operation of the testing device at a distance. Remote control operation of the testing device may also be performed.

Figure 2:
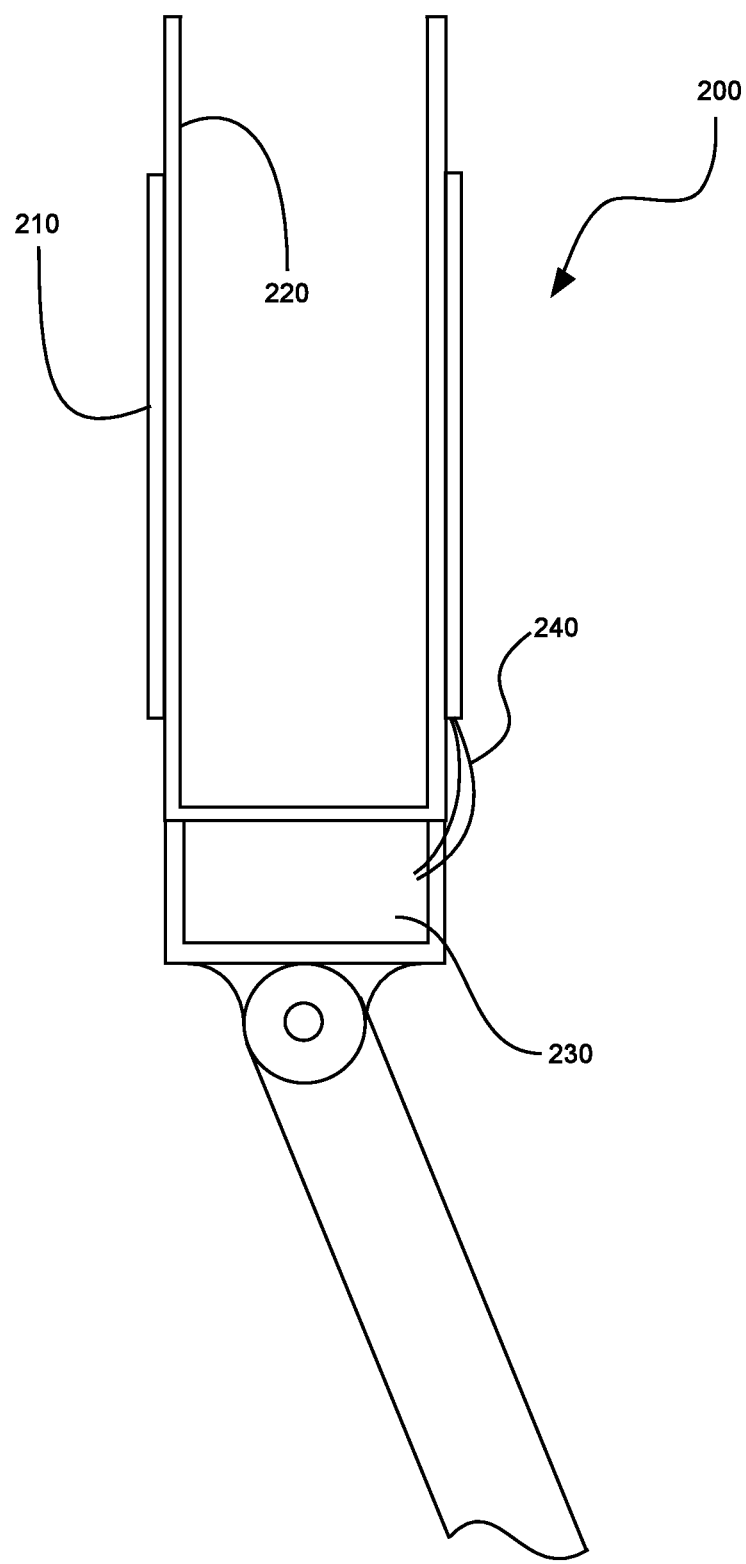
FIG. 2 is a cross-sectional view of a thermal detector testing device in accordance with an embodiment.
Figure 3:
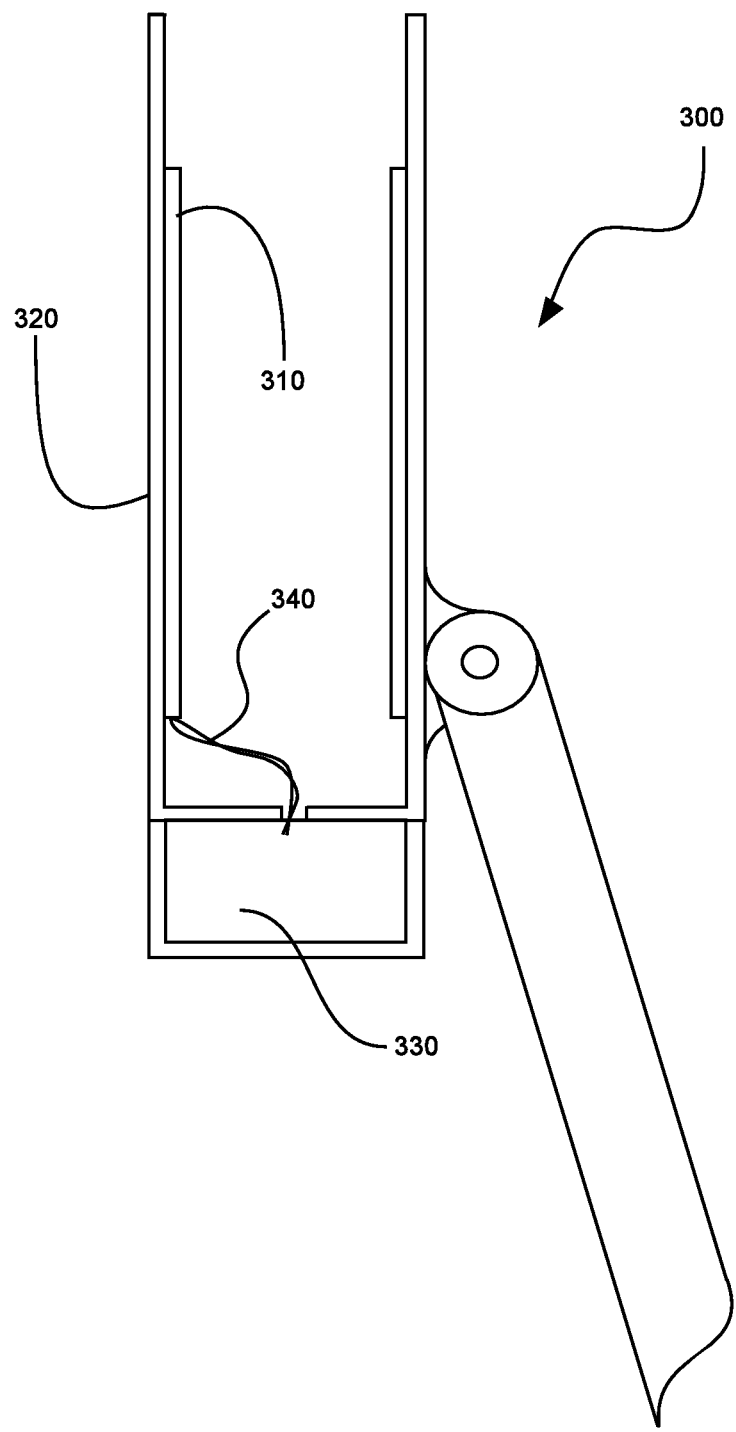
FIG. 3 is a cross-sectional view of a thermal detector testing device in accordance with an embodiment.

Referring to FIG. 2, a device 200 is shown which is similar in many regards to the device 100 described above. The testing device 200 may comprise a hollow heat conductive sleeve 220 configured to receive a heat detector. A heater 210 may circumscribe the hollow heat conductive sleeve to provide heat for testing a heat detector. The heater may be electrically coupled 240 to a power source 230. FIG. 3 depicts a similar embodiment. In this embodiment, the device 300 includes a hollow sleeve 320 which is minimally heat conductive and a heater 310 surrounding an inside of the hollow sleeve. The heater can directly heat a heat detector. Also shown is a power source 330 to which the heater is coupled 340. The embodiments shown in FIGS. 2 and 3 may further include other elements as described herein.

Figure 4:
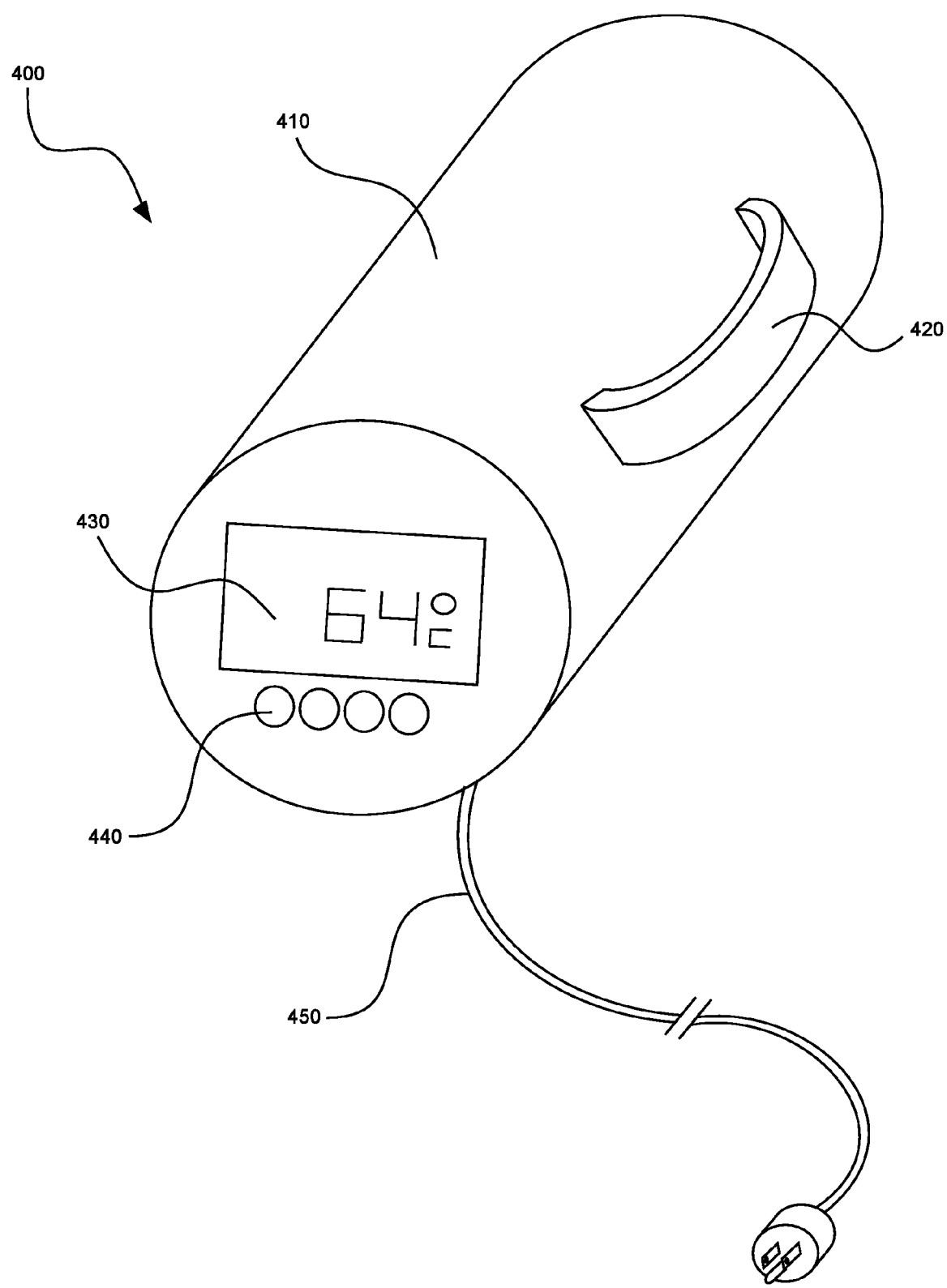
FIG. 4 is a perspective view of a thermal detector testing device in accordance with an embodiment.

The system 400 of FIG. 4 depicts a device which is similar in many regards to other embodiments described above. The system may include a housing or hollow sleeve 410, inside of which is a heater. Where in some situations it may be unnecessary to have an elongate, extensible boom, this embodiment incorporates a handle 420 on a side of the system. A user may grasp the handle to position the device over a heat detector.

Shown at one end of the system is a display 430. The display may be an LCD or other suitable type of display for displaying useful information to the user. Some information which may be displayed includes temperature of the heater, progress of the test, the type of test being performed, etc. In one aspect, the display may be a touch screen interface. The system may also include buttons 440, knobs, or other interface devices for a user to control the operation of the system. The power source shown in this embodiment is a power cord 450 for plugging into an AC power outlet. The power cord may be used to charge a battery within the device or simply to provide AC power. The power cord may be detachable. In another aspect, the power cord may be retractable within the device.

As described above, operational testing of heat detectors can be a dangerous, difficult or time consuming process, and can often be completed using makeshift methods and/or heat sources. It is an advantage that the system and method herein provide a safe, efficient and reliable device and method for testing heat detector installations. The system and method are capable of testing multiple types of detectors or detectors employing multiple types of detection. In addition, the system and method do not require replacement of heating pads, wafers, etc. at each testing. The system can use low power consumption and have a controlled and variably adjustable amount of power supplied to the heater to control and/or variably adjust the amount of heat provided by a heater used with the detector tester.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:
1. A testing device for thermal detectors, comprising:
a hollow circular heat conductive sleeve, open on at least one end, configured to receive a thermal detector;
a flexible foil heater in proximity to at least a portion of the hollow heat conductive sleeve;
a power source configured to provide power to the flexible foil heater;
a conic funnel coupled to an open end of the hollow heat conductive sleeve where an inner diameter of the conic funnel is the same as the inner diameter of the hollow heat conductive sleeve and at least partially thermally isolated from the hollow heat conductive sleeve, operable to guide a thermal detector into the hollow heat conductive sleeve; and
a heat shield substantially surrounding the hollow heat conductive sleeve and the flexible foil heater, and thermally insulated using spacing in a radial direction from the hollow heat conductive sleeve and the flexible foil heater so as to be safe for human touch during operation of the heater.

2. A testing device in accordance with claim 1, wherein the thermal detector is a rate compensated thermal detector.

3. A testing device in accordance with claim 1, wherein the hollow heat conductive sleeve has a length greater than a diameter.

4. A testing device in accordance with claim 1, wherein the power source is a rechargeable battery.

5. A testing device in accordance with claim 1, further comprising a power control module for variably adjusting a set point temperature or a rate of temperature rise for the flexible foil heater.

6. A testing device in accordance with claim 1, further comprising a boom with the hollow heat conductive sleeve disposed at a distal end thereof, and configured to allow testing of thermal detectors at a distance.

7. A testing device in accordance with claim 6, wherein the boom is adjustably extendable.

8. A testing device in accordance with claim 1, further comprising a control unit to monitor and control temperature of the flexible foil heater during testing of the thermal detector.

9. A testing device in accordance with claim 8, wherein the control unit is configured to raise the temperature of the flexible foil heater according to specifications for activating a rate-of-temperature-rise thermal detector.

10. A testing device in accordance with claim 1, further comprising an output module for user monitoring of testing progress.

11. A testing device in accordance with claim 10, wherein the output module comprises an LED configured to blink and indicate progress of a test.

12. A testing device in accordance with claim 10, wherein the output module is operable to monitor testing progress and provide output for a user.

13. A testing device for thermal detectors, comprising:
  a cylindrical, circular, hollow heat conductive sleeve having a length greater than a diameter, and open on at least one end;
  a heater at least partially circumscribing a portion of the hollow heat conductive sleeve;
  a cone shaped funnel coupled to an open end of the heat conductive sleeve where an inner diameter of the cone shaped funnel is the same as the inner diameter of the heat conductive sleeve and at least partially thermally isolated from the heat conductive sleeve, operable to guide a thermal detector into the hollow heat conductive sleeve; and
  a power source configured to provide power to the heater.

14. A testing device in accordance with claim 13, wherein the thermal detector is a rate compensated thermal detector.

15. A testing device in accordance with claim 13, wherein the heater comprises a flexible foil heater.

16. A testing device in accordance with claim 13, further comprising a power control module for variably adjusting a set point temperature or a rate of temperature rise for the heater.

17. A testing device for thermal detectors, comprising:
  a hollow circular heat conductive sleeve having a length greater than a diameter, and open on at least one end, configured to receive a thermal detector oriented perpendicular to an attachment surface;
  a heater adjacent to the hollow heat conductive sleeve;
  a cone shaped funnel coupled to an open end of the hollow sleeve where an inner diameter of the cone shaped funnel is the same as the inner diameter of the hollow sleeve and is at least partially thermally isolated from the hollow sleeve, operable to guide a thermal detector into the hollow sleeve;
  a power source configured to provide power to the heater;
  a power control module for variably adjusting a set point temperature or a rate of temperature rise for the heater; and
  a temperature monitor electrically coupled to the power control module,
  wherein the power control module receives input from the temperature monitor and is configured to recognize a need to provide a level of power to the heater based on the input.

* * * * *